G. S. ADAMS.
RESILIENT TIRE.
APPLICATION FILED APR. 6, 1911.
1,022,220.
Patented Apr. 2, 1912.
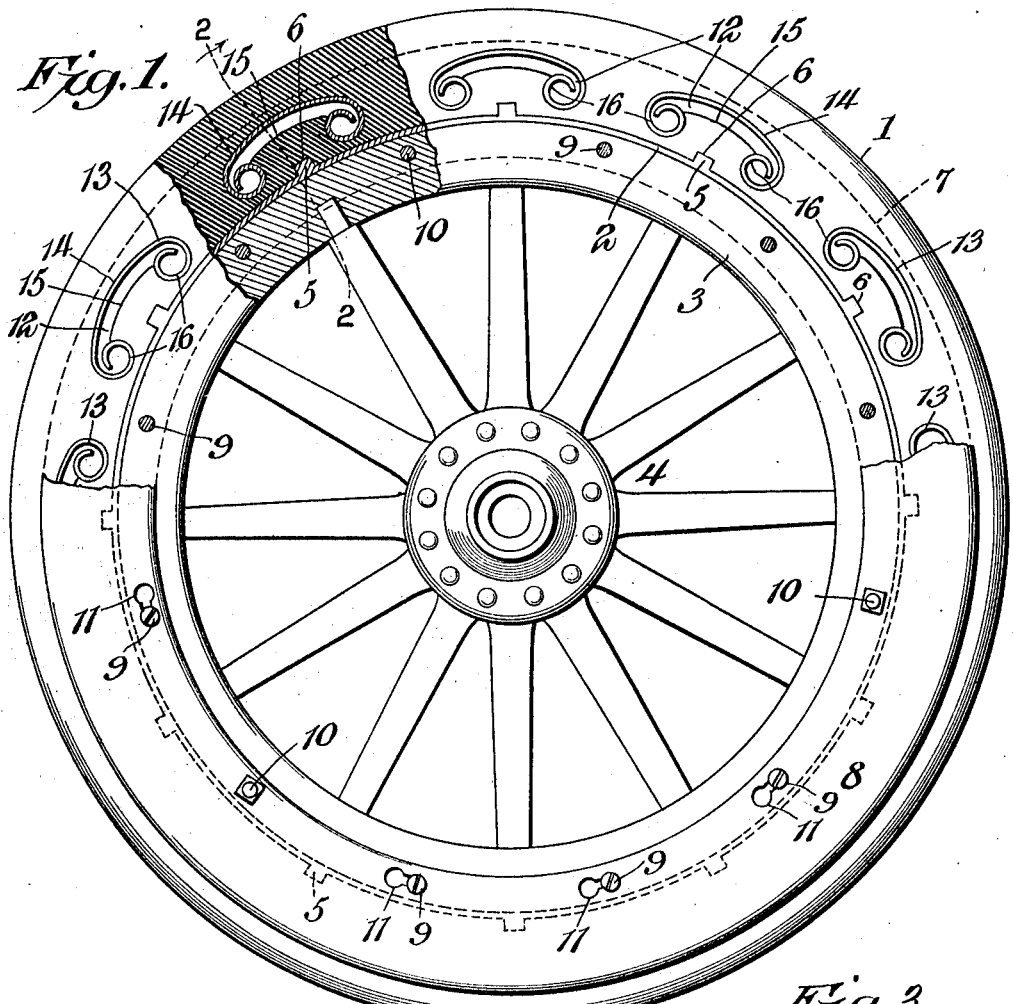
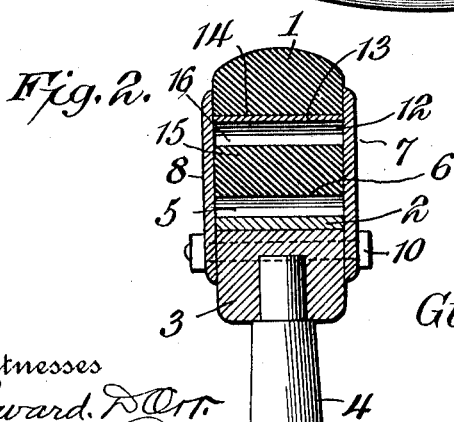
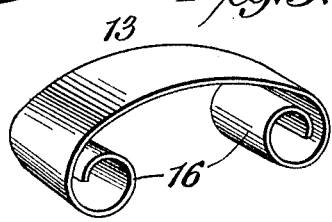
Gideon S. Adams, Inventor,

UNITED STATES PATENT OFFICE.

GIDEON S. ADAMS, OF SEAVILLE, NEW JERSEY, ASSIGNOR, BY DIRECT AND MESNE ASSIGNMENTS, TO EUREKA DOUBLE RESILIENT TIRE MFG. CO., OF CAMDEN, NEW JERSEY.

RESILIENT TIRE.

1,022,220.  Specification of Letters Patent.  Patented Apr. 2, 1912.

Application filed April 6, 1911. Serial No. 619,431.

*To all whom it may concern:*

Be it known that I, GIDEON S. ADAMS, a citizen of the United States, residing at Seaville, in the county of Cape May and State of New Jersey, have invented a new and useful Resilient Tire, of which the following is a specification.

The invention relates to improvements in resilient tires.

The object of the present invention is to improve the construction of resilient tires, and to provide a simple, inexpensive and efficient cushion tire, designed to take the place of pneumatic tires, and adapted to afford the desired resiliency and at the same time present a strong and durable construction, capable of withstanding the strain incident to its use on an automobile or similar machine.

A further object of the invention is to provide a cushion tire of this character having a relatively highly resilient outer peripheral portion, and provided with an inner solid rubber cushioning portion, adapted to receive and support the highly resilient outer portion and prevent the same from being injured when the tire is subjected to an excessive abnormal strain.

The invention also has for its object to provide means for affording easy access to the interior of the cushion tire without entirely removing all of the fastening bolts thereof.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation, partly in section, of a wheel, constructed in accordance with this invention. Fig. 2 is a transverse sectional view on the line 2—2 of Fig. 1. Fig. 3 is a detail perspective view of one of the cushioning springs.

Like numerals of reference designate corresponding parts in all the figures of the drawing.

In the accompanying drawing in which is illustrated the preferred embodiment of the invention, 1 designates a cushion tire, constructed of solid rubber and interlocked at its inner edge with a metallic band or rim 2, preferably shrunk on a wooden felly 3 of a wheel 4, which may be of any preferred construction. The metallic rim is provided at its outer face with projecting transverse ribs 5, fitting in transverse grooves 6 in the inner face or periphery of the tire 1. The tire is retained in place by circular side plates 7 and 8, secured to the felly by transverse bolts 9 and 10, piercing the felly and the plate 7 and extending through the plate 8, which is provided with key hole slots 11 to interlock with the heads of the bolts 9. The bolts 10 are arranged in perforations of both of the side plates and are removed when it is desired to detach the side plate 8 to afford access to the tire. When the bolts 10, which are preferably three in number, are removed and the other bolts have been loosened, the plate 8 may be partially rotated to carry the enlarged portions of the slots to the heads of the bolts 9. The enlarged portions of the key hole slots are of sufficient size to permit the side plate 8 to be passed over the heads of the bolts 9 to enable the side plates to be interlocked with and disconnected from the said bolts 9. By this construction it is not necessary to remove all of the nuts of the bolts, when it is desired to detach the plate 8, and in replacing the same it is only necessary to engage it with the heads of the bolts 9, tighten the nuts thereof and replace the bolts 10. The side plates terminate short of the outer face or tread of the tire.

The cushion tire is provided with an annular series of curved slots 12, disposed longitudinally of the tire and extending entirely through the same from one side face to the other and receiving springs 13. The outer wall 14 of each slot is concave and the inner wall, which is substantially convex, forms a projecting cushioning seat 15, spaced from the spring and the outer wall of the slot a sufficient distance to enable the spring and the outer portion of the tire to co-act and form a relatively highly resilient cushion to absorb the ordinary strains and jars to which the tire is subjected. When, however, an abnormal or excessive strain is placed on the tire, the outer resilient portion is forced inwardly upon the cushioning seat 15, which is of solid rubber and which is adapted to support and prevent the spring and its coils from becoming broken or otherwise injured through excessive strains and jars. The slots are separated by intervals of solid rubber portions, which extend from the inner edge or face of the tire to the outer face or tread of the same. The spring 13 conforms to the configuration of the outer wall and ends of the slot 12, and it consists of end loops or coils 16 and a curved connecting portion. The curved connecting portion fits against the outer wall 14 of the slot, and the loops or coils 16 are arranged at the ends of the slot at opposite sides of the cushioning seat, which is interposed between the coiled terminal portions of the spring. The convex seat, which has its end portions arranged in approximately the plane of the outer portions of the coils of the spring 13, projects centrally beyond the plane of the coils. The spring may be varied in size and strength to adapt the wheel to various kinds of vehicles and machines, and while it is primarily for use on automobiles and other motor vehicles, it may be advantageously employed on any vehicle where a cushion tire is desirable. The cushioning seat 15, which extends from one coil or loop 16 to the other, is concave at its ends to conform to the configuration of the loops or coils, and it assists in bracing and supporting the same.

Having thus fully described my invention, what I claim as new and desire to secure by Letters Patent, is:—

1. The combination of a solid elastic tire provided with an annular series of curved longitudinal slots spaced apart at their ends and separated by intervals of solid portions extending from the inner edge of the tire to the tread thereof, said slots forming outer highly resilient portions, inner projecting cushioning seats located intermediate of the ends of the slots, and curved springs mounted in the slots and bearing against the outer wall thereof and having terminal coils located at the opposite ends of the seats.

2. The combination of a solid elastic tire provided with an annular series of curved longitudinal slots spaced apart at their ends and separated by intervals of solid portions extending from the inner edge of the tire to the tread thereof, said slots forming outer highly resilient portions, inner projecting cushioning seats terminating short of the ends of the slots, and curved springs mounted in the slots and bearing against the outer walls thereof and having terminal coils located at the opposite ends of the seats, the outer portions of the coils being approximately in the plane of the end portions of the seats and the central portions of the seats projecting outward beyond the plane of the coils, whereby the latter are prevented from being crushed when the tire is subjected to excessive strain and the outer walls of the slots are compressed against the cushioning seats.

In testimony, that I claim the foregoing as my own, I have hereto affixed my signature in the presence of two witnesses.

GIDEON S. ADAMS.

Witnesses:
 Guy W. Griffith,
 Anna M. Schmitz.

Copies of this patent may be obtained for five cents each, by addressing the "Commissioner of Patents, Washington, D. C."